United States Patent
Liu et al.

(10) Patent No.: US 11,622,116 B2
(45) Date of Patent: Apr. 4, 2023

(54) CROSS-VALIDATION OF VIDEO ENCODING

(71) Applicant: HULU, LLC, Santa Monica, CA (US)

(72) Inventors: Chen Liu, Beijing (CN); Wenhao Zhang, Beijing (CN); Deliang Fu, Beijing (CN); Xiaobo Liu, Beijing (CN); Xuchang Huangfu, Beijing (CN)

(73) Assignee: HULU, LLC, Santa Monica, CA (US)

( * ) Notice: Subject to any disclaimer, the term of this patent is extended or adjusted under 35 U.S.C. 154(b) by 129 days.

(21) Appl. No.: 17/218,888

(22) Filed: Mar. 31, 2021

(65) Prior Publication Data
US 2022/0321892 A1    Oct. 6, 2022

(51) Int. Cl.
*H04N 19/147*    (2014.01)
*H04N 19/105*    (2014.01)
*H04N 19/172*    (2014.01)
*H04L 65/70*     (2022.01)
*H04L 65/80*     (2022.01)

(52) U.S. Cl.
CPC ........... *H04N 19/147* (2014.11); *H04L 65/70* (2022.05); *H04L 65/80* (2013.01); *H04N 19/105* (2014.11); *H04N 19/172* (2014.11)

(58) Field of Classification Search
CPC .. H04N 19/147; H04N 19/105; H04N 19/172; H04L 65/70; H04L 65/80
USPC ................................................... 375/240.02
See application file for complete search history.

(56) References Cited

U.S. PATENT DOCUMENTS

| | | | |
|---|---|---|---|
| 10,616,590 B1 * | 4/2020 | Wei | H04N 19/124 |
| 2004/0017850 A1 | 1/2004 | Kim et al. | |
| 2012/0307074 A1 | 12/2012 | Bhagavathy et al. | |
| 2014/0177703 A1 * | 6/2014 | Shah | H04N 19/196 375/240.02 |
| 2015/0326861 A1 * | 11/2015 | Chung | H04L 43/0835 375/240.02 |
| 2018/0242015 A1 * | 8/2018 | Katsavounidis | H04L 65/80 |
| 2020/0059652 A1 | 2/2020 | Brice et al. | |
| 2020/0145709 A1 * | 5/2020 | Katsavounidis | H04N 21/854 |
| 2020/0169593 A1 * | 5/2020 | Katsavounidis | H04N 19/142 |
| 2021/0120063 A1 * | 4/2021 | Katsavounidis | H04N 19/59 |
| 2021/0203950 A1 * | 7/2021 | Kottke | H04N 19/154 |
| 2022/0264168 A1 * | 8/2022 | Dahl | H04L 65/765 |

FOREIGN PATENT DOCUMENTS

WO    2020043280 A1    3/2020

OTHER PUBLICATIONS

EP Application Serial No. 22163743.2, EESR mailed Aug. 18, 22, 9 pgs.

* cited by examiner

*Primary Examiner* — Christopher S Kelley
*Assistant Examiner* — Asmamaw G Tarko
(74) *Attorney, Agent, or Firm* — Kwan & Olynick LLP

(57) ABSTRACT

In some embodiments, a method receives a current encoding stream of a video. A first measurement for a reference encoding stream is selected to measure a quality of the reference encoding stream. The method compares a second measurement of the current encoding stream to the first measurement of the reference encoding stream and outputs whether the current encoding stream is validated based on the comparing.

20 Claims, 13 Drawing Sheets

CROSS-VALIDATION OF VIDEO ENCODING

BACKGROUND

A service may receive a source video that will be offered on its video delivery service. Before publishing the video on the video delivery service, the service encodes the source video into different profiles. For example, the profiles may represent different combinations of bitrate and/or quality.

It is possible that the encoded version of the source video includes encoding errors. If the video with the encoding errors is published, the errors may affect the viewing experience negatively. Accordingly, the service may monitor the encoding stream to determine which encoding streams may include encoding errors before publishing the video. One method of monitoring the encoding stream for errors may require users to manually view the encoding stream from start to end to determine if there are any encoding errors. For example, a user may watch a movie from start to end and check whether any errors can be seen. Videos may range from 30 minutes to multiple hours and each video may also be encoded into multiple profiles. Manually checking each encoded video may require a large number of hours and is manually intensive and slow. Additionally, the validation is subject to human errors in that a user may miss an encoding error or the user may miss a less obvious encoding error.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Described herein are techniques for an encoding system. In the following description, for purposes of explanation, numerous examples and specific details are set forth to provide a thorough understanding of some embodiments. Some embodiments as defined by the claims may include some or all the features in these examples alone or in combination with other features described below and may further include modifications and equivalents of the features and concepts described herein.

A system uses a cross-validation process that automatically validates an encoding stream. The cross-validation process may use a reference encoding stream to cross validate a current encoding stream for errors. The reference may include similar characteristics to the current encoding stream, which improves the validation because variations in quality in the reference encoding stream may be used to validate the current encoding stream. For example, the cross-validation process may use quality information from the reference encoding stream to determine a quality threshold list for the current encoding stream. The cross-validation process may adjust the quality information from the reference encoding stream based on a difference between the reference encoding stream and the current encoding stream. For example, the reference encoding stream may be for a profile that is associated with a lower bitrate and/or quality. A delta quality threshold may consider the difference between the profile of the current encoding stream and the profile of the reference encoding stream. Then, the values in the quality threshold list may be adjusted by the delta quality threshold, which results in a list of quality thresholds that are used to validate the current encoding stream. The cross-validation process may check the current encoding stream for errors based on the quality threshold list. If errors are found, the cross-validation process may identify portions of the current encoding stream that have errors. Then, the process may fix the errors, such as by re-processing the portions that have encoding errors.

The cross-validation process may be performed automatically to detect the errors. The automatic detection may save many manual hours that were required to visually check the encoding streams. Further, the use of the reference encoding stream may improve the automatic process of checking for errors by providing quality information that may be more accurate for predicting whether there are errors in the current encoding stream. Additionally, by identifying portions of the current encoding stream that have errors, the re-processing of the current encoding stream may save computing resources in that the whole current encoding stream does not need to be re-processed.

System Overview

Figure 1:
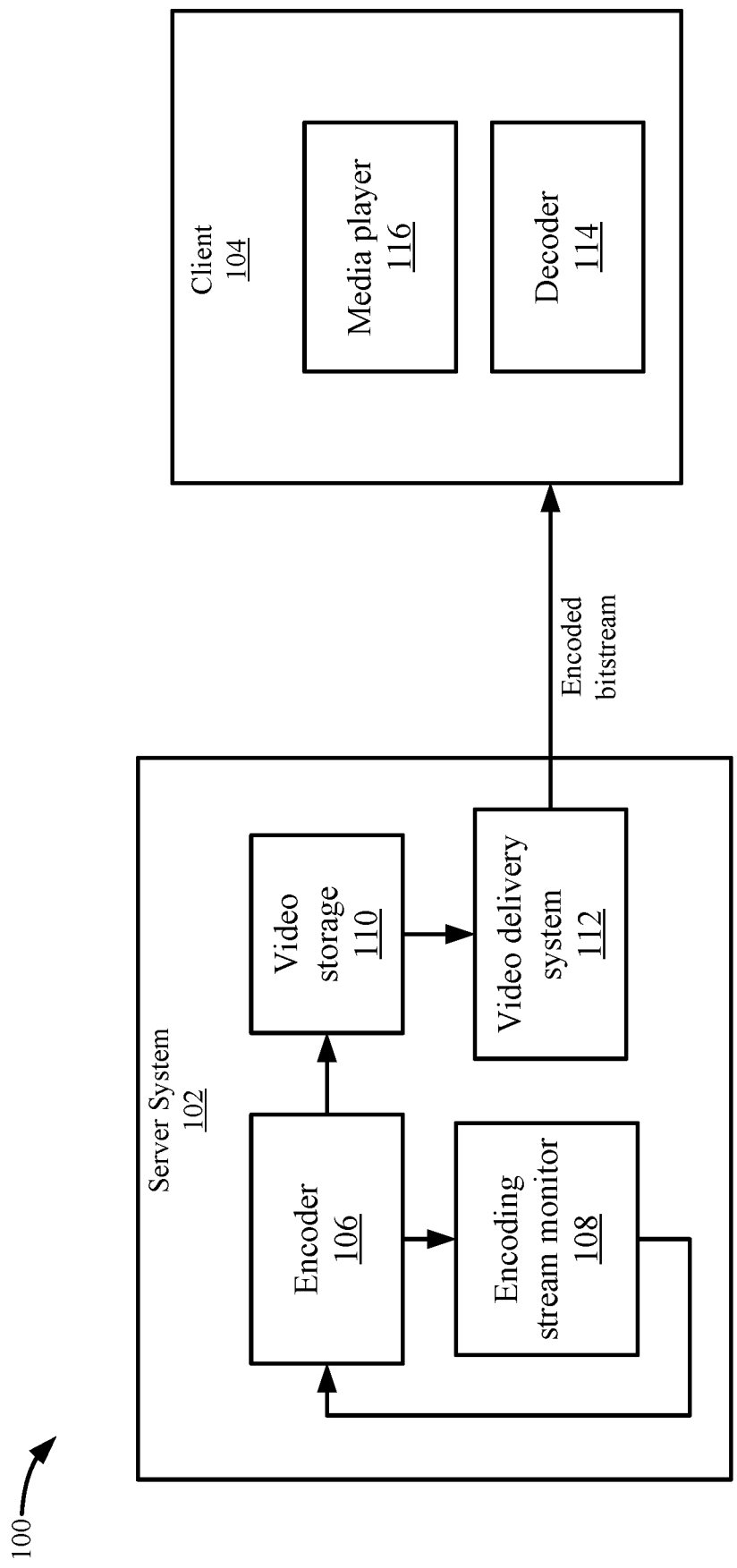
FIG. 1 depicts a simplified system for encoding videos according to some embodiments.

FIG. 1 depicts a simplified system 100 for encoding videos according to some embodiments. System 100 includes a server system 102 and client 104. Although one server system 102 and one client 104 are shown, it is understood that multiple clients 104 and multiple server systems 102 may be used. For instance, server system 102 may include multiple servers and may communicate with multiple clients 104. Also, content delivery networks (CDNs) may be used to deliver videos to clients 104 and are not shown.

Server system 102 may include a video delivery system 112 that facilitates sending an encoded bitstream of a video to client 104. For example, video delivery system 102 may provide a video delivery service that allows client 104 to request videos, such as videos on-demand or live videos from live television. As discussed above, video delivery system 112 may use a content delivery network to deliver the encoded bitstream of the video. In this case, encoded versions of the video may be sent to the content delivery network for delivery to client 104.

Client 104 may include various computing devices, such as smartphones, living room devices, tablet devices, personal computers, etc., that can play back a video. Video delivery system 112 may provide an application that is displayed in an interface at client 104. A user account may log onto the application to access the video delivery service. Then, video delivery system 112 may receive a video request from client 104 and process the video request to allow client 104 to stream the video. Upon receiving the encoded bitstream, a decoder 114 decodes the bitstream. A media player 116 may play the decoded bitstream on a user interface at client 104.

Server system 102 includes an encoder 106 that encodes a source video. For example, a source video may be received from a source, such as a content provider. Encoder 106 may encode the source video into different encoded bitstreams, which may be referred to as encoding streams. As is known, a video may be encoded in multiple profiles that correspond to different levels, which may be different levels of bitrates and/or quality. In some embodiments, a source video is encoded into a profile ladder that includes profiles that can be used for a video. The profiles include different levels that are associated with a characteristic, such as a bitrate and/or quality characteristic. The bitrate may be the number of bytes per second that can be sent, and the quality characteristic may measure the quality of a video. A resolution of the video may be related to the quality characteristic, such as a higher resolution is associated with a higher quality. The level of a profile in the profile ladder may be determined based on how the video is transcoded for that level, such as a video may be transcoded at 400 kilobytes per second (Kbps) and a resolution of 270p. The resolution of 270p may represent a number of pixels that is used in the resolution of the video.

Encoder 106 may output the encoding streams to an encoding stream monitor 108, which can validate the encoding streams. As will be discussed in more detail below, encoding stream monitor 108 may perform a cross-validation process that validates the encoding stream. If the encoding stream is not validated, encoder 106 may re-encode the video using different encoding parameters. Once the encoding stream is validated, encoder 106 may store the encoding stream in a video storage 110. For example, the video may be published and can be requested by client 104 after publishing. For example, client 104 may request a segment of video from one of the profiles based on current playback conditions. In some examples, client 104 may use an adaptive bitrate algorithm to select the profile for the video based on the current available bandwidth and other network conditions.

Encoding Process

Figure 2:
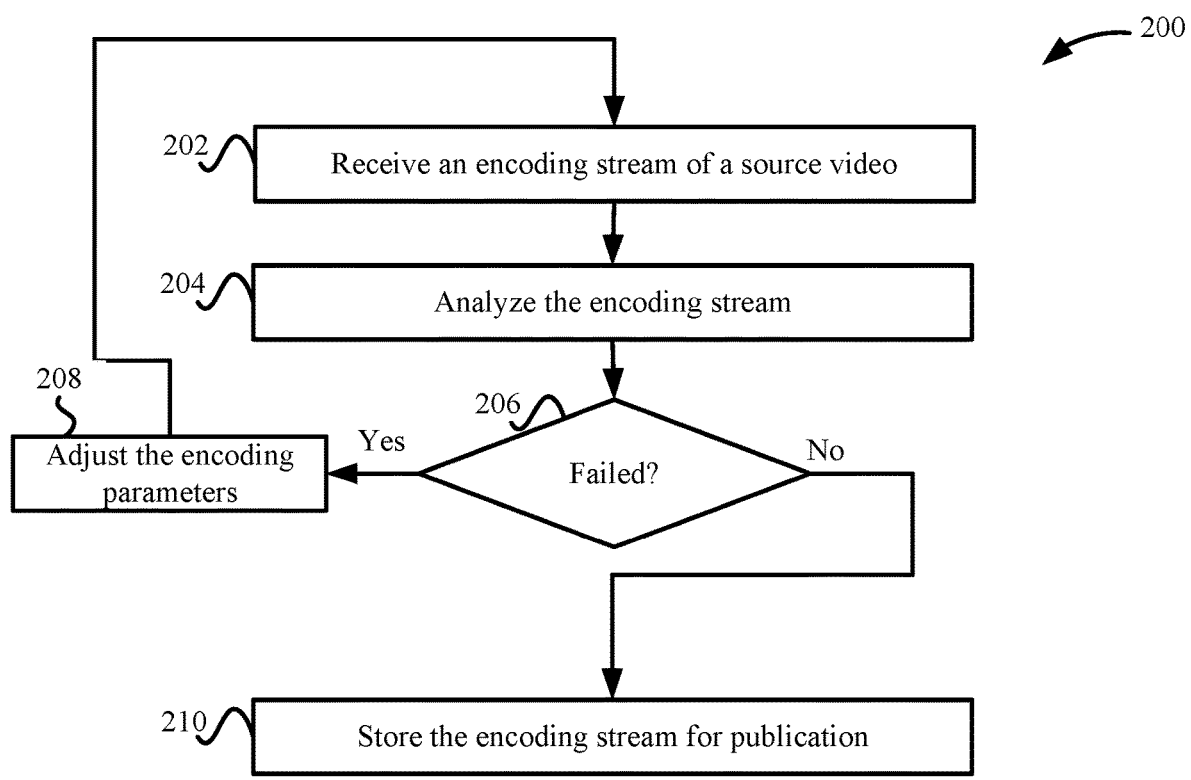
FIG. 2 depicts a simplified flowchart of a method for encoding a source video according to some embodiments.

FIG. 2 depicts a simplified flowchart 200 of a method for encoding a source video according to some embodiments. At 202, encoding stream monitor 108 receives a current encoding stream of a source video. The current encoding stream may be an encoded bitstream that is output by encoder 106. For example, encoder 106 may encode the source video into multiple profiles, such as profiles that may be associated with different combinations of bitrate and quality. In some embodiments, a number of profiles, such as nine profiles, may be used. The profiles may be associated with bitrates of 200, 300, 400, 650, 1000, 1500, 2000, 2500, and 3200 Kbps, but other bitrates may be used. In one example, encoder 106 may be encoding a profile at 300 Kbps after encoding a profile at 200 Kbps.

At 204, encoding stream monitor 108 analyzes the current encoding stream. The analysis will be described in more detail below.

At 206, encoding stream monitor 108 determines if the validation of the current encoding stream failed. If the validation failed, at 208, encoding stream monitor 108 may adjust the encoding parameters. For example, encoding stream monitor 108 may analyze the errors in the current encoding stream and determine different transcoding parameters based on the errors. For example, encoding stream monitor 108 may output the difference in quality between the reference encoding stream and the current encoding stream. This difference may be used to adjust the parameters accordingly. For example, a large difference between the reference encoding stream quality and the current encoding stream quality may result in a larger adjustment of the parameters. Also, encoding stream monitor 108 may determine the location of the errors and provide the location to encoder 106 such that encoder 106 can only re-encode portions of the source video based on the location of the errors (e.g., not the whole source video).

At 210, if the current encoding stream does not fail the cross-validation, at 210, encoding stream monitor 108 stores the current encoding stream for publication.

Cross-validation Embodiments

Figure 3:
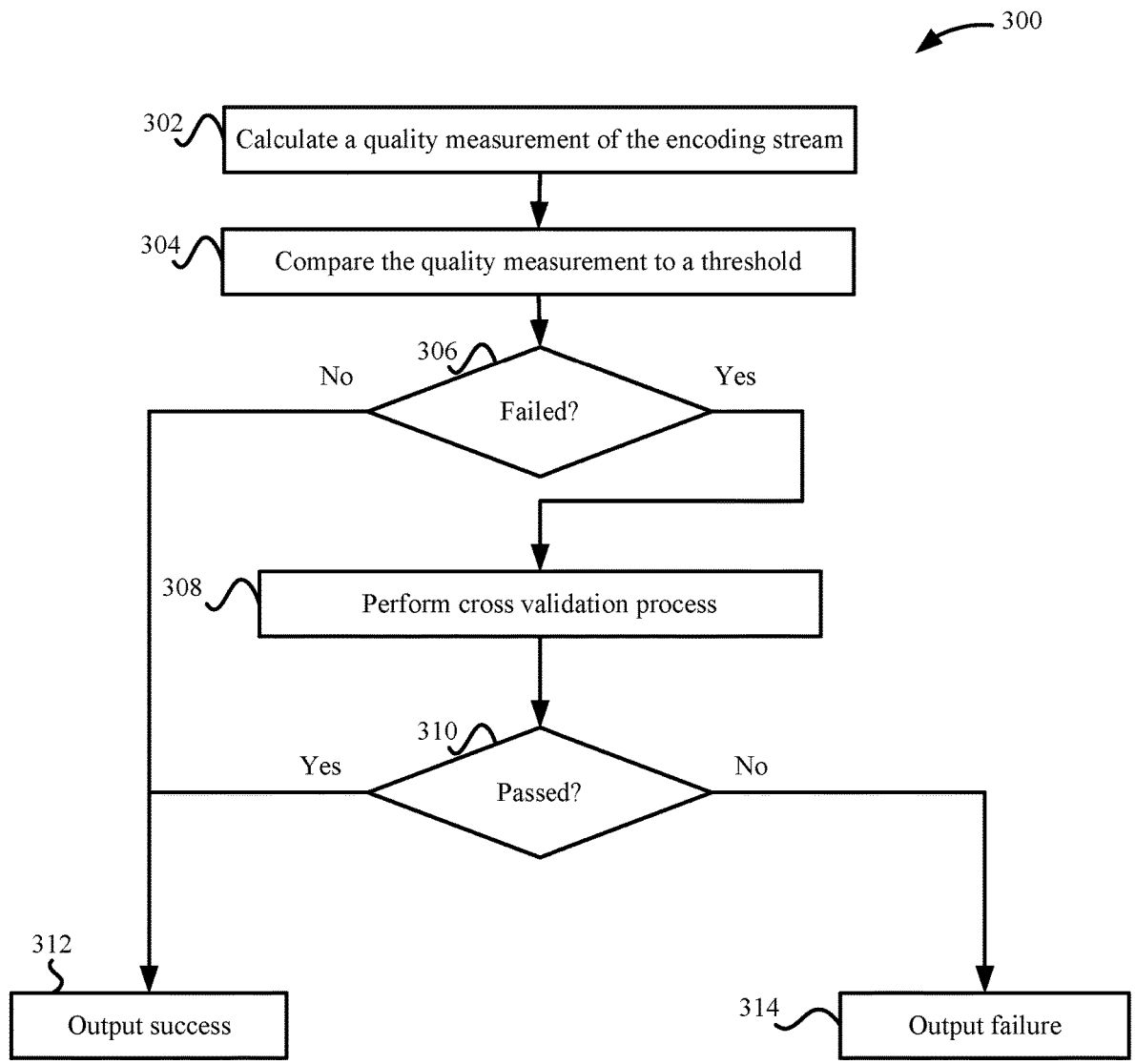
FIG. 3 depicts a simplified flowchart of a method for performing cross-validation in the encoding stream pipeline according to some embodiments.

The cross-validation may be performed in the encoding stream pipeline in different ways. The following describes two methods of performing the cross-validation, but other methods may be appreciated. FIG. 3 depicts a simplified flowchart 300 of a method for performing cross-validation in the encoding stream pipeline according to some embodiments. At 302, encoding stream monitor 108 calculates a quality measurement of the current encoding stream. The quality measurement may be the average quality for the entire current encoding stream of the profile. For example, encoding stream monitor 108 may calculate the average of a quality measurement, such as a peak signal-to-noise ratio (PSNR), for each frame of the current encoding stream. Other measurements may also be used, such as a maximum peak signal-to-noise ratio out of a portion of frames, all the frames, etc.

At 304, encoding stream monitor 108 compares the quality measurement to a threshold. The threshold may be a static quality threshold that does not change. For example, the static quality threshold may not change for portions of the current encoding stream, such as for a portion of frames or frame-by-frame. Also, the threshold may not change across multiple videos. For example, for the same profile of 300 Kbps, the same static quality threshold may be used for all source videos that are encoded for the 300 Kbps profile. In some examples, a peak signal-to-noise ratio of 30 decibels (dB) may be the quality threshold that is used for this profile.

At 306, encoding stream monitor 108 determines if the current encoding stream failed the validation. If not, at 312, encoding stream monitor 108 outputs information indicating the encoding was a success. The current encoding stream can be published at this point. For example, no further validations (e.g., the cross-validation) may be performed.

If the current encoding stream failed the validation, at 308, encoding stream monitor 108 performs a cross-validation process. One reason when the cross-validation process is performed after the first comparison to the static threshold is that using the static threshold may have a high false alarm ratio. There may be a high false alarm ratio because the quality of a video encoding may vary throughout the video depending on the video characteristics. For example, some portions of the video may have a large amount of motion and some portions may include mostly static objects or not have much detail (e.g., a black screen). The frames with high motion may have a lower quality than frames with static objects. The static threshold may be set at a value that may flag encoding errors that may not be actual errors, such as a frame with high motion content that may be flagged as an error, but may not have any encoding errors. For example, the frames with high motion may have a lower quality than the frames with static objects. In some examples, for a video with large noise (e.g., a movie), the peak signal-to-noise ratio maybe be around 32 decibels (dB) to 36 dB in general. However, for a cartoon, the peak signal-to-noise ratio may be around 42 dB to 45 dB in general. Therefore, if the static threshold is set too high for peak signal-to-noise ratio, most of the videos with high noise do not pass the validation with the static threshold even though the video does not have encoding errors. Also, if the static threshold is set too low for peak signal-to-noise ratio, some of the cartoons may pass the validation even though the cartoons may have encoding errors because the cartoons naturally have a higher peak signal-to-noise ratio. Accordingly, using the static threshold, there may be high false positives in certain types of videos. The cross-validation using a similar reference encoding may overcome this problem because the quality threshold varies based on the characteristics of the reference.

Previously, when the current encoding stream fails the validation with the static threshold, typically, the video was reviewed manually, which wasted resources. However, in some embodiments, encoding stream monitor 108 automatically performs the cross-validation process when the first validation fails.

At 310, encoding stream monitor 108 determines if the current encoding stream passed the cross-validation. The cross-validation process will be described in more detail below. If the cross-validation passed, at 312, encoding stream monitor 108 outputs an indication that the current encoding stream is successfully encoded without errors. In some cases, the cross-validation may validate the encoding stream after it has failed the first validation. For example, where the current encoding stream may fail the first validation, but pass the cross-validation is when the current encoding stream has large noise, the peak signal-to-noise ratio may be lower than the static threshold, but in the cross-validation process, the current encoding stream may pass because the current encoding stream is compared with a reference encoding stream that changes the threshold based on characteristics of the reference encoding stream.

If the current encoding stream does not pass the cross-validation, at 314, encoding stream monitor 108 outputs a failure, which means encoding errors are detected. The cross-validation process may check the current encoding stream in more detail to determine if there are errors. Also, if the cross-validation fails, the cross-validation may identify locations in the current encoding stream that had the errors, which may remove the requirement to manually view the video to determine where the errors have occurred. Also, the cross-validation process may provide parameters to use when re-encoding the video, such as a target quality to use.

Figure 4:
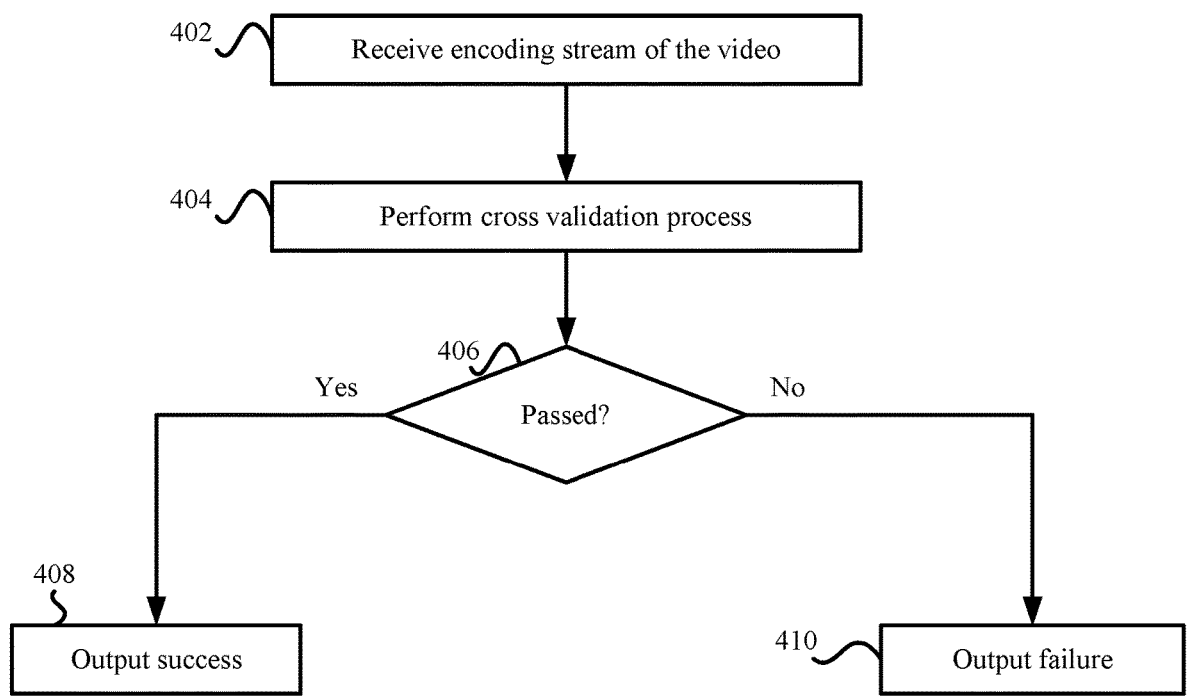
FIG. 4 depicts a simplified flowchart of a method for performing the cross-validation process according to some embodiments.

The cross-validation method may also be used as a stand-alone process. For example, FIG. 4 depicts a simplified flowchart 400 of a method for performing the cross-validation process according to some embodiments. At 402, encoding stream monitor 108 receives the current encoding stream of a video. For example, encoding stream monitor 108 receives the current encoding stream from encoder 106 without any other validation checks being performed for encoding errors. At 404, encoding stream monitor 108 performs the cross-validation process. At 406, encoding stream monitor 108 determines if the current encoding stream passed the cross-validation process. If so, encoding stream monitor 108 outputs an indication of a success for the validation. If not, encoding stream monitor 108 outputs an indication of a failure of the validation. Accordingly, the first validation is removed from the process. One reason to not include the first validation check with the static threshold is that videos (e.g., cartoons as described above) may have higher peak signal-to-noise ratio and may pass the static threshold, but still have encoding errors. Although the above encoding pipeline flows are described, other flows that incorporate the cross-validation process may be used.

Cross-validation Process

Figure 5:
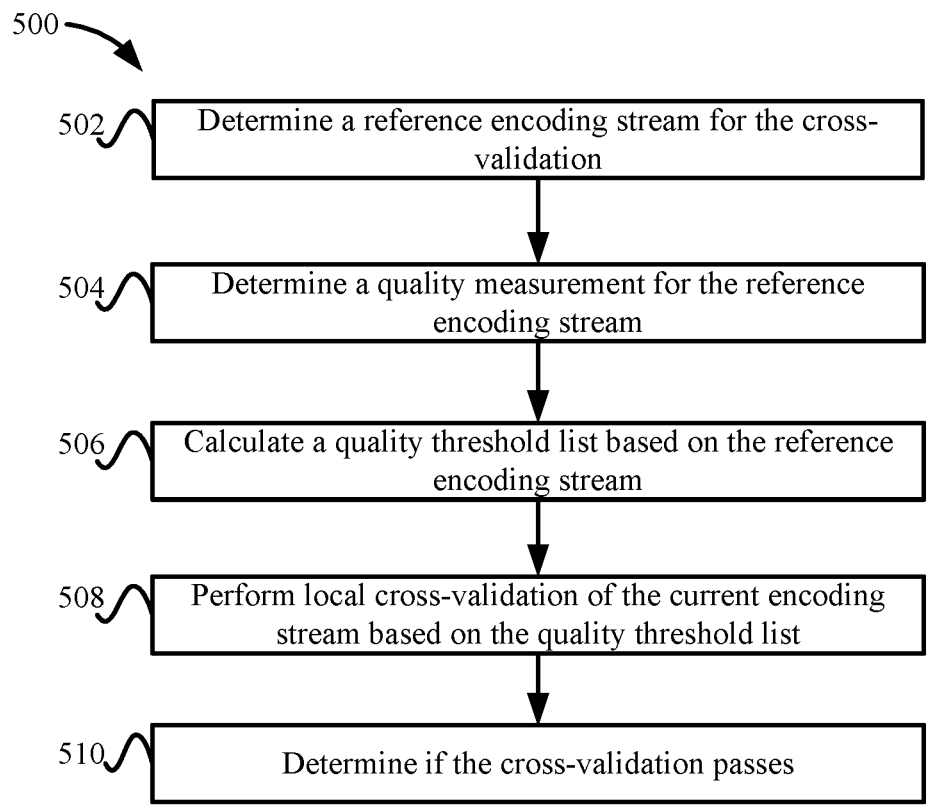
FIG. 5 depicts a simplified flowchart of a method for performing the cross-validation process according to some embodiments.

The cross-validation process will now be described in more detail. FIG. 5 depicts a simplified flowchart 500 of a method for performing the cross-validation process according to some embodiments. At 502, encoding stream monitor 108 selects a reference encoding stream for the cross-validation. Encoding stream monitor 108 may determine the reference encoding stream in different ways. In some embodiments, encoding stream monitor 108 may receive a selection of a reference encoding stream or select the reference encoding stream. For example, encoding stream monitor 108 attempts to determine a reference encoding stream that includes similar characteristics to the current encoding stream. In some embodiments, encoding stream monitor 108 may compare characteristics of the current encoding stream to characteristics of possible reference encoding streams. Encoding stream monitor 108 may then select a reference encoding stream from a set of reference encoding streams that is considered to be an optimal reference (e.g., most similar) to the current encoding stream. In some embodiments, encoding stream monitor 108 may calculate a score for each reference encoding stream based on the characteristics of the stream. The reference encoding stream with a score that is most similar to the current encoding stream may be selected. In some embodiments, encoding stream monitor 108 may determine a profile for the current encoding stream. If there is another profile that was previously encoded for the same source video, encoding stream monitor 108 may select that reference encoding stream. For example, if the 300 Kbps profile is being encoded, encoding stream monitor 108 may select the 200 Kbps profile as the reference encoding stream. It is expected that the encoding stream for the 200 Kbps profile may have similar characteristics to the current encoding stream.

In some cases, the current encoding stream may be the first encoding stream that has been encoded for the source video. Encoding stream monitor 108 may select a reference encoding stream from another encoder that may be considered reliable and would have very little or no errors. For example, if the encoder for the current encoding stream is using a first protocol, such as H.265, encoding stream monitor 108 may select a reference encoding stream from a more established encoding protocol, such as H.264. The H.264 protocol has been used reliably for many years while the H.265 protocol is relatively new. The reference encoding stream from the H.264 encoder may be more reliable and there may be confidence that this reference encoding stream does not have many encoding errors. Also, encoding stream monitor 108 may analyze content of the streams to determine a reference encoding stream that includes similar content with the current encoding stream.

Figure 6:
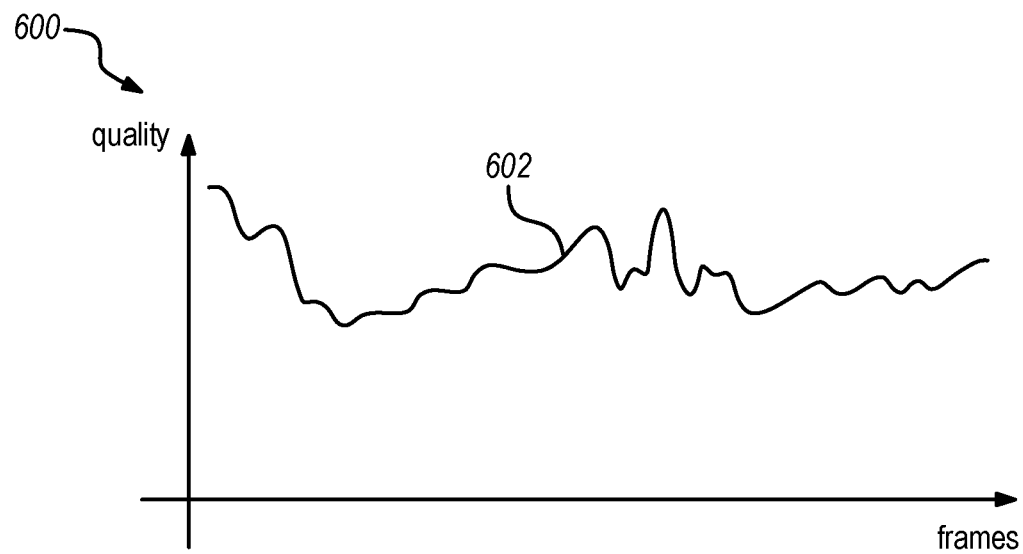
FIG. 6 depicts a graph that maps quality to frames of the video according to some embodiments.

At 504, encoding stream monitor 108 determines a quality measurement for the frames of the reference encoding stream. A frame may be a portion of the video, such as an image. The quality measurement may provide information to quantify the quality for frames of the video. The quality measurement may be for each frame, multiple frames, every other frame, etc. FIG. 6 depicts a graph 600 that maps quality to frames of the video according to some embodiments. For example, graph 600 includes a quality measurement on the Y axis, such as peak signal-to-noise ratio, and the identification of frame numbers on the X axis. A line 602 maps the quality for the frames. The quality measurement is not static and varies for different frames. There may also be big differences in quality between frames, such as when there is a lot of motion in a frame, scenes change, etc. Using the variation in quality in the reference encoding stream improves the cross-validation because there may be points where the quality measurement of the current encoding stream falls below a static threshold, but the frames at that point do not include encoding errors.

Rather, the frames may be associated with content that is encoded at a lower quality due to the characteristics of the video.

Figure 7:
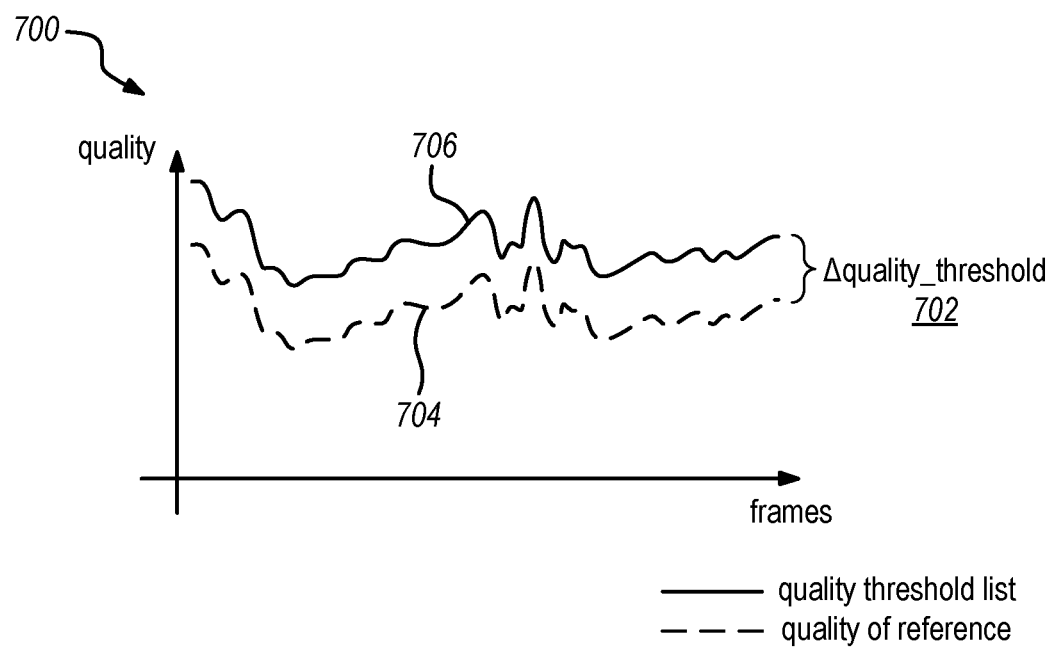
FIG. 7 depicts an example of the adjustment according to some embodiments.

Referring back to FIG. 5, at 506, encoding stream monitor 108 calculates a quality threshold list based on the reference encoding stream. The quality threshold list may be an adjusted quality measurement to the initial quality measurement. The adjustment may be performed based on any differences between the reference encoding stream and the current encoding stream. For example, the reference encoding stream may be based on the 200 Kbps profile whereas the current encoding stream is based on a 300 Kbps profile. The 200 Kbps profile may be encoded with a target quality that is different from the 300 Kbps profile. That is, the 300 Kbps profile may have a higher quality than the 200 Kbps profile. The quality threshold list makes an adjustment based on these differences. FIG. 7 depicts an example of the adjustment according to some embodiments. For example, FIG. 7 depicts a graph 700 of a quality threshold list according to some embodiments. Graph 700 includes the quality measurement on the Y axis and the frames on the X axis. A delta quality threshold 702 represents an adjustment of the quality measurement of the reference encoding stream. For example, the quality measurement for the reference encoding stream is shown at 704. The result of the adjustment to the quality measurement based on the delta quality threshold is shown at 706. As can be seen, the quality measurement for frames is adjusted based on the delta quality threshold. In this example, the adjustment quality measurement is increased from the original quality measurement, but it will be understood that the adjusted quality measurement may be adjusted in other directions, such as lower. That is, if the reference encoding stream is from a higher quality profile than the current encoding stream, then the quality measurement may be adjusted to be lower.

The delta quality threshold may be calculated based on the differences between the reference encoding stream and the current encoding stream. In some embodiments, the delta quality threshold $\Delta$quality_threshold could be calculated by the follow function.

$$\Delta\text{quality\_threshold} = f(\text{bitrate}_{cur}, \text{bitrate}_{ref}, \text{quality}_{ref}).$$

The variable $\text{bitrate}_{cur}$ may be the bitrate of the profile used to encode the current encoding stream and the variable $\text{bitrate}_{ref}$ may be the bitrate of the profile for the reference encoding stream. The variable $\text{quality}_{ref}$ may be the quality level of the profile of the reference encoding stream. In some embodiments, $\text{bitrate}_{cur}$ is the average bitrate of current encoding stream, $\text{bitrate}_{ref}$ is the average bitrate of reference encoding stream, and $\text{quality}_{ref}$ is the average quality of reference encoding stream. The above indicates that the delta quality threshold is a function of the bitrate of the current encoding stream, the bitrate of the reference encoding stream, and the quality of the reference encoding stream. One example for the function f is shown below, but others may be used.

$$\Delta\text{quality\_threshold} = \left( f(\text{quality}_{ref}) * \frac{\text{bitrate}_{cur} - \text{bitrate}_{ref}}{\text{bitrate}_{cur}} \right) * \text{safe\_factor}$$

The function $f(\text{quality}_{ref})$ may represent a conversion coefficient of bitrate and quality under a different quality range. The conversion coefficient may convert a change in values of bitrate to a change values in the quality measurement (bitrate to peak signal-to-noise ratio). For example, a ten percent change in bitrate may be a 0.5 change in dB for peak signal-to-noise ratio. Different methods of implementing the conversion of bitrate changes to changes in quality may be appreciated. The variable safe_factor represents the conservative use of the value for $\Delta$quality_threshold. That is, the safe factor may not adjust the reference quality measurement to its full conversion. For example, encoding stream monitor 108 may set the safe factor to 0.9 to capture 90% of the conversion, such as instead of adjusting the quality threshold level to 100 peak signal-to-noise ratio, encoding stream monitor 108 adjusts the threshold to 90 peak signal-to-noise ratio.

Additionally, encoding stream monitor 108 may apply a static quality threshold (e.g., a limit or clamp) to the adjusted quality measurement. The static quality threshold may limit the range of the quality threshold list. For example, if a certain quality level is met by a frame or group of frames, then that quality level may be acceptable even if the quality level of the adjusted quality measurement goes above the static quality threshold. Encoding stream monitor 108 may set the static quality threshold to 35 dB for peak signal-to-noise ratio, but other values may be used. Accordingly, encoding stream monitor 108 may limit any quality thresholds that are for a frame or group of frames that are higher than the static quality threshold to the value of the static quality threshold.

Figure 8:
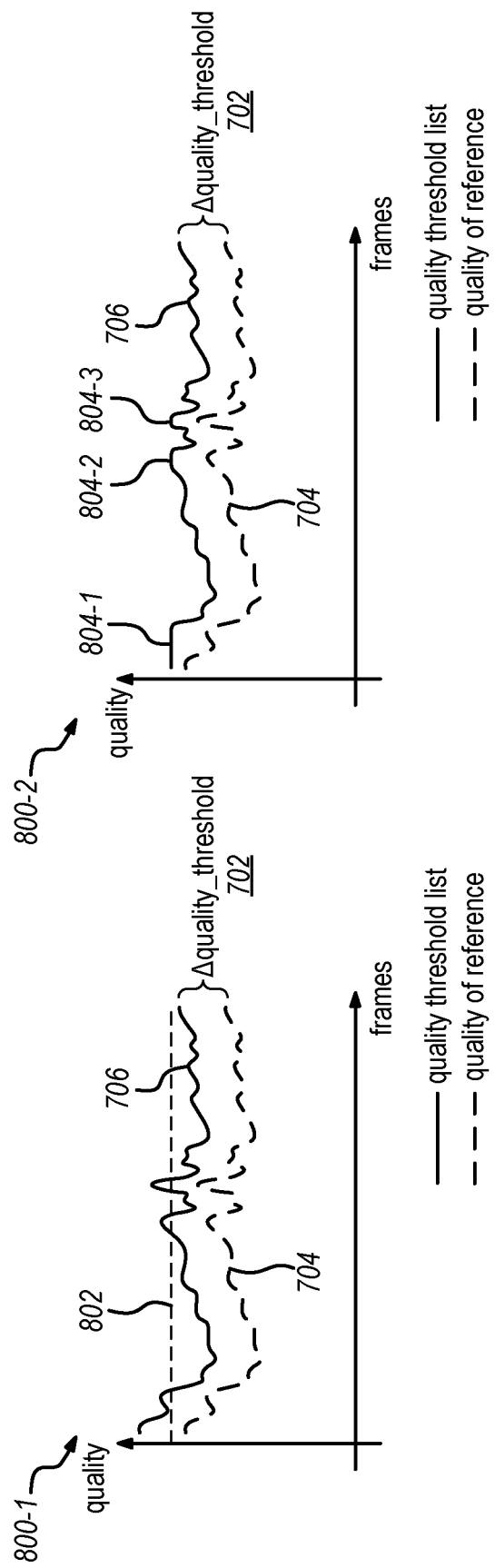
FIG. 8 depicts an example of applying a static quality threshold to the quality threshold list according to some embodiments.

FIG. 8 depicts an example of applying a static quality threshold to the quality threshold list according to some embodiments. A graph 800-1 shows a static quality threshold and the relationship to the adjusted quality threshold list at 706. At 802, the static quality threshold may be applied across the entire encoding stream. The static quality threshold may be set at a pre-determined value that is considered an acceptable quality level. In a graph 800-2, the static quality threshold is applied to the quality threshold list. For example, any measurements that are above the static quality threshold may be adjusted to the static quality threshold. Areas of the quality threshold list that were above the static quality threshold are shown at 804-1, 804-2, and 804-3. These values for the quality threshold list have been adjusted to the static quality threshold. By applying the static quality threshold, encoding stream monitor 108 may determine that some frames that are below the original quality list may not be errors because the quality of the frames is sufficient. For example, the current encoding stream may not meet the original reference quality level, but may be above the static quality threshold.

Referring back to FIG. 5, at 508, encoding stream monitor 108 performs local validation of the current encoding stream on a set of frames in the current encoding stream. The local validation compares quality measurements for a set of frames to corresponding thresholds for corresponding frames in the quality threshold list. The local validation may be performed at the frame level to locally determine frames that may include encoding errors. Encoding stream monitor 108 may compare the quality threshold list to the quality for frames in the current encoding stream. In some embodiments, encoding stream monitor 108 may use a sliding window to check the quality of the current encoding stream. The sliding window may be set to a number of frames, which may be between one frame to the entire video. However, in some embodiments, encoding stream monitor 108 uses a window that is less than the entire video to locally identify some frames with encoding errors and some frames without encoding errors. The size of the window may determine the amount of computing resources that is used. For example, a smaller window size may perform more calculations to analyze the entire encoding stream than a larger window size. However, the larger window size may be less sensitive to distinguishing where the encoding errors are on the frame level. For instance, a sliding window of one or two frames may be able to determine the local encoding errors by one or two frames. However, a larger window size may not be able to determine the encoding errors to the exact frame. At 510, encoding stream monitor 108 outputs a determination of whether the current encoding stream is validated. Different methods may be used to determine whether the current encoding stream is validated and are described in more detail below.

Figure 9:
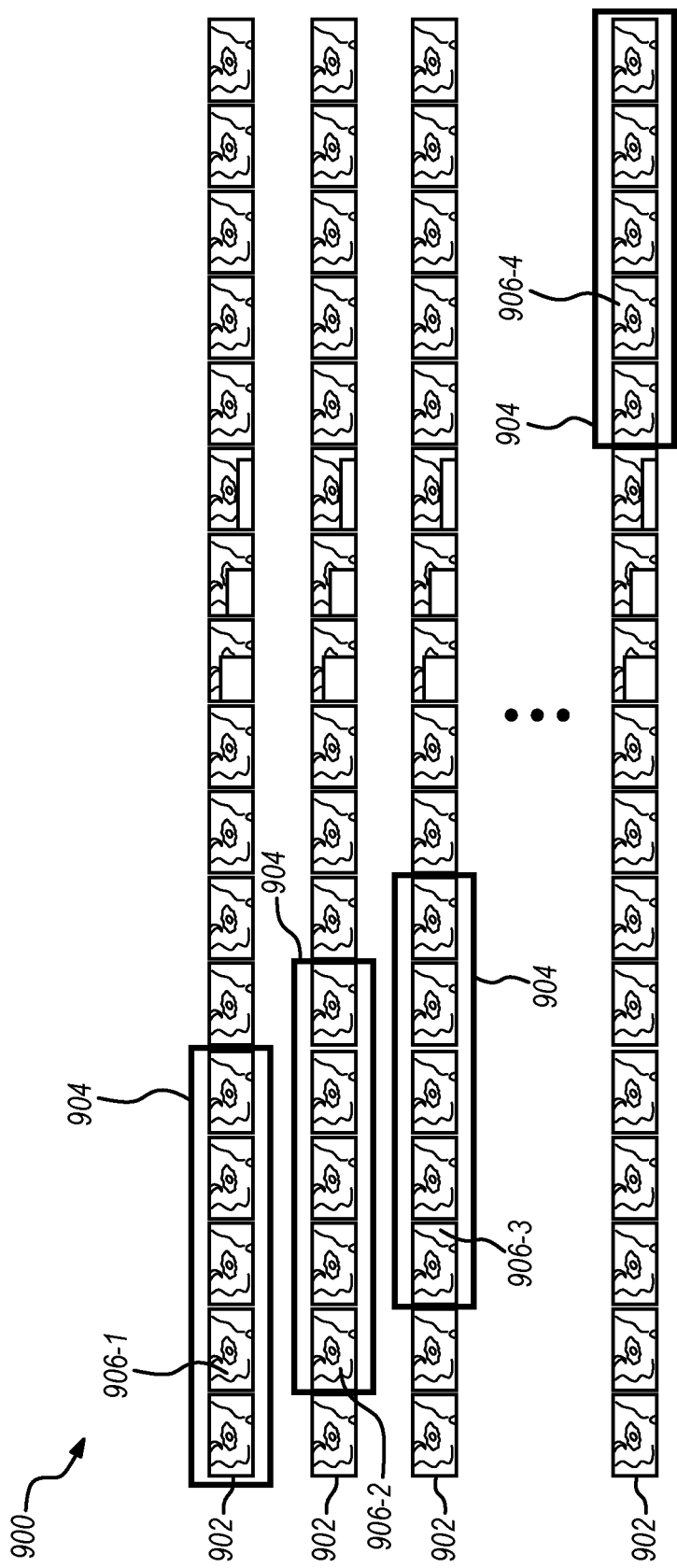
FIG. 9 depicts an example of a process for using local validation according to some embodiments.

FIG. 9 depicts an example 900 of a process for using local validation according to some embodiments. Frames of the video are shown at 902 and may be from the first frame to the last frame of the current encoding stream. Encoding stream monitor 108 uses a window 904 to determine the frames to analyze in the local validation. In this example, window 904 is five frames, but encoding stream monitor 108 may use different numbers of frames.

In the cross-validation process, encoding stream monitor 108 analyzes the five frames in window 904 and then slides the window across the frames of the current encoding stream 902. For example, after analyzing the five frames at 906-1, encoding stream monitor 108 slides window 904 to 906-2 to analyze five more frames. In some embodiments, encoding stream monitor 108 slides window 904 one frame at a time, but encoding stream monitor 108 may slide window 904 at different numbers of frames for analysis. In the single frame sliding window, window 904 slides to 906-3, and so on to the last five frames at 906-4.

In each sliding window step, encoding stream monitor 108 calculates the local quality of the current encoding stream and the local quality of the quality threshold list for the frames in the current window 904. Coding stream monitor 108 may compare the different quality measurements and determine if these frames fail the validation or pass the validation. The quality measurement that is used for the frames in window 904 may be different measurements, such as average quality, maximum quality, minimum quality, etc. Also, weighted quality may be used to represent the local quality, such as:

$$\text{weighted\_quality} = \Sigma_{i=0}^{size\ of\ sliding\ window} \text{weight}_i \times \text{quality}_i.$$

Weighted quality may weight frames in window 904 differently. For example, the middle frame may be weighted the highest to make the quality of the middle frame the most important in window 904. Other methods may be used, such as not using any weighting, weighting the first frame higher, etc.

Figure 10:
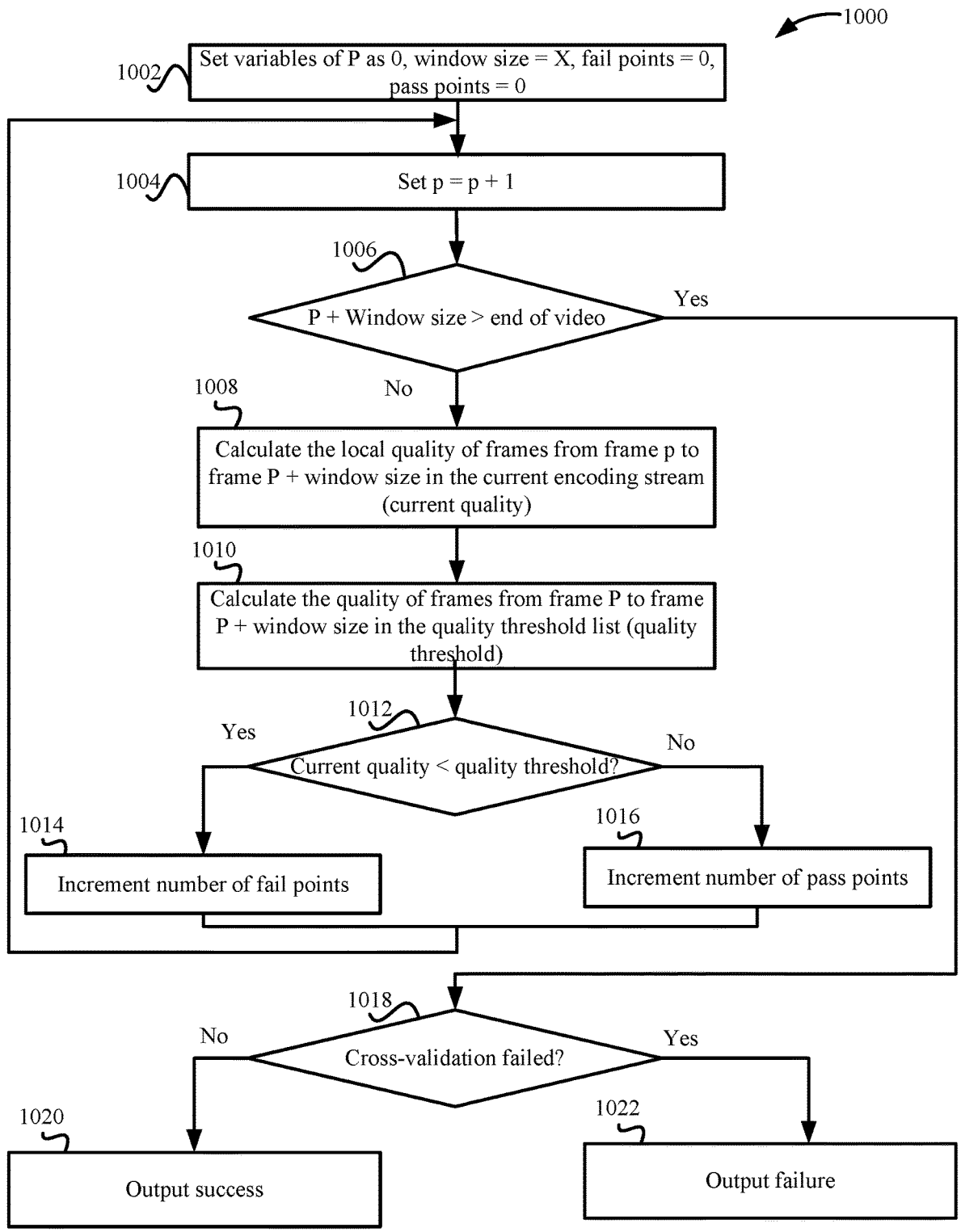
FIG. 10 depicts a simplified flowchart of a method for analyzing the quality of the current encoding stream according to some embodiments.

FIG. 10 depicts a simplified flowchart 1000 of a method for analyzing the quality of the current encoding stream according to some embodiments. At 1002, encoding stream monitor 108 sets variables of a variable P as 0, a window size of a size X, a variable of "fail points" equal to 0, and a variable of "pass points" equal to 0. The variable fail points and the variable pass points count the number of failures and successes during the analysis. The variable P is a frame identifier that identifies the frame in the video. Encoding stream monitor 108 may use the variable P as the start point of the sliding window 904.

At 1004, encoding stream monitor 108 sets the variable P to be equal to P+1. This sets the window as the first frame of the video. At each subsequent analysis, encoding stream monitor 108 may increment the window or may slide the window one frame. It is noted that the window may be moved more than one frame.

At 1006, encoding stream monitor 108 determines if window size is greater than the end of the video. That is, encoding stream monitor 108 determines if the sliding window has gone past the end of the video. In this case, the analysis process may end and proceeds to 1018, which will be described later. If the sliding window has not reached the end of the video, at 1008, encoding stream monitor 108 calculates the local quality of the frames from frame P to frame P+window size in the current encoding stream. This may be referred to as the "current quality". At 1010, encoding stream monitor 108 calculates the quality of the frames from frame P to frame P+window size in the quality threshold list. This may be referred to as the "quality threshold". Accordingly, encoding stream monitor 108 measures the local quality in window 904 for the current encoding stream and the quality threshold list.

At 1012, encoding stream monitor 108 determines if the current quality is less than the quality threshold. For example, if the current quality is less than the quality threshold, then encoding stream monitor 108 determines that the portion in window 904 for the current encoding stream may have errors in it because the quality is lower than the reference encoding stream. Although the above analysis is determined, other comparisons between the current quality and the quality threshold may be used, such as using a weighting of the quality threshold.

If the current quality does not meet (e.g., is lower) than the quality threshold, at 1014, encoding stream monitor 108 increments the number of fail points, such as by one. If the current quality meets (e.g., is greater) than the quality threshold, at 1016, encoding stream monitor 108 increments the number of pass points. The process reiterates to 1004 where variable P is incremented, which slides window 904 by a number of frames P.

Eventually, the end of the video will be reached by window 904, and at 1018, encoding stream monitor 108 determines if the cross-validation failed. For instance, encoding stream monitor 108 may determine if the number of fail points meets (e.g., is larger) than a threshold. For example, encoding stream monitor 108 may count the number of fail points and only compare the number of fail points to a threshold. In some embodiments, a ratio of fail points to pass points may be used and is compared to a threshold, but other methods may be used. The ratio may consider that there may be only a small number of encoding errors based in the video based on the number of comparisons, and those small numbers of encoding errors may be acceptable. The use of only fail points may not consider the length of the video. For example, encoding stream monitor 108 may use 100% as a pass threshold, which means if there is one fail point, encoding stream monitor 108 will output a failure. But, other scenarios may value timeliness or calculation resources more than quality, such as, there may be little time to re-transcode the current encoding stream because the stream may need to be published soon. For these scenarios, encoding stream monitor 108 could tolerate some errors, such as one or two frames that have low quality, and, encoding stream monitor 108 could set this pass threshold to a lower number, such as 99%.

At 1020, the cross-validation did not fail and encoding stream monitor 108 outputs an indication of success. Further review of the current encoding stream may not be necessary, and the current encoding stream may be output for publishing (e.g., streaming to a client). At 1022, the cross-validation failed, and encoding stream monitor 108 may output an indication of failure. Further processing of the current encoding stream may then be performed. Encoding stream monitor 108 may also output information that may be helpful in re-processing the source video, such as the location of errors and adjusted parameters.

Figure 11A:
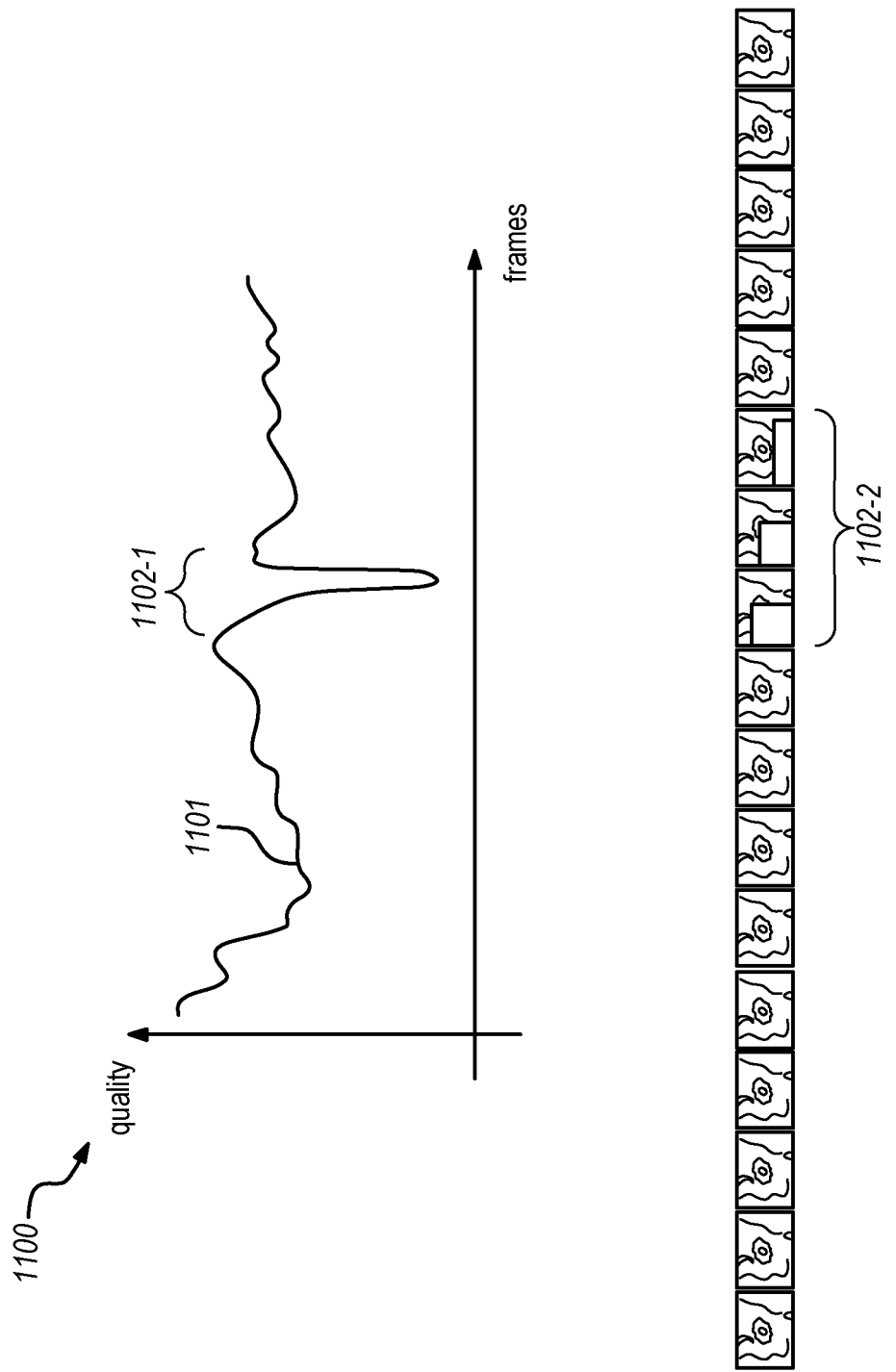
FIG. 11A depicts an example of detecting encoding errors according to some embodiments.

FIG. 11A depicts an example of detecting encoding errors according to some embodiments. A graph 1100 shows the quality on the Y axis and the frames for the current encoding stream on the X axis. A line 1101 shows the quality of the current encoding stream.

At 1102-1, the quality measurement drops for a number of frames. This may indicate that there is a quality problem that is local to these frames. Because a sliding window is being used, the encoding errors may be detected locally in these frames. These errors are shown at 1102-2 in the current encoding stream where some of the frames include encoding errors indicated by the boxes.

Figure 11B:
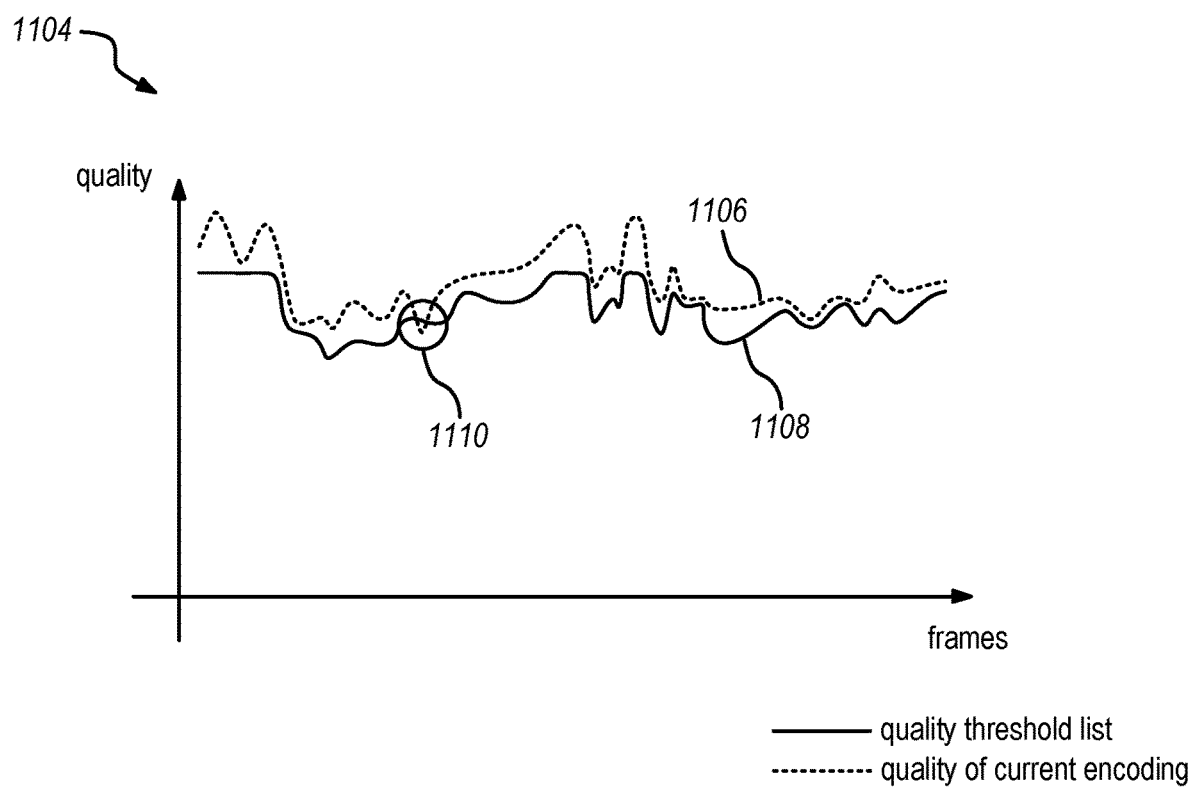
FIG. 11B depicts an example of detecting encoding errors using the threshold list according to some embodiments.

FIG. 11B depicts an example of detecting encoding errors using the threshold list according to some embodiments. A graph 1104 shows the quality on the Y axis and the frames for the current encoding stream on the X axis. A line 1106 shows the quality of the current encoding stream and a line 1108 shows the quality of the threshold list. The quality of the current encoding stream may not meet the threshold list at a point shown at 1110. encoding stream monitor 108 determines that this point in the current encoding stream includes an encoding error.

Encoding stream monitor 108 may output an identification of the frames that may include the encoding errors. Additionally, encoding stream monitor 108 may output information that may be used to adjust the encoding parameters. Encoding stream monitor 108 may analyze the identified frames in this range and determine an adjustment. For example, if encoding stream monitor 108 determined that these frames have an obvious block boundary, encoding stream monitor 108 could suggest a heavy deblock filter for this group of pictures (GOP) or chunk, or if encoding stream monitor 108 determines that these frames have noise, encoding stream monitor 108 could suggest a denoise filter for them. Other suggestions include sample adaptive offset (SAO), rate distortion (rd) level, motion search settings, etc.

Conclusion

Accordingly, encoding stream monitor 108 automatically performs a validation of a current encoding stream. The use of the reference encoding stream allows a dynamic threshold to be used. This improves the validation and also allows the validation to reduce false positives and reduce the amount of computing resources that are used.

Example Embodiments

In some embodiments, a method comprising: receiving, by a computing device, a current encoding stream of a video; selecting, by the computing device, a reference encoding stream based on a similarity between the reference encoding stream and the current encoding stream; selecting, by the computing device, a first measurement for the reference encoding stream to measure a quality of the reference encoding stream; comparing, by the computing device, a second measurement of the current encoding stream to the first measurement of the reference encoding stream; and outputting, by the computing device, whether the current encoding stream is validated based on the comparing.

In some embodiments, selecting the reference encoding stream comprises: comparing a first characteristic of the current encoding stream to a second characteristic of the reference encoding stream; and determining whether to use the reference encoding stream as a reference for the current encoding stream.

In some embodiments, selecting the reference encoding stream comprises: comparing the current encoding stream to a plurality of reference encoding streams; and selecting the reference encoding stream from the plurality of reference encoding streams based on a similarity to the current encoding stream.

In some embodiments, selecting the reference encoding stream comprises: using a reference encoding stream from another encoding of the video at a different bitrate.

In some embodiments, selecting the reference encoding stream comprises: using a reference encoding stream from another encoding of the video using a different encoding protocol than that used for encoding the current encoding stream.

In some embodiments, selecting the first measurement for the reference encoding stream comprises: determining the first measurement for at least a portion of frames of the reference encoding stream.

In some embodiments, selecting the first measurement for the reference encoding stream comprises: determining the first measurement for each frame in the reference encoding stream.

In some embodiments, selecting the first measurement for the reference encoding stream comprises: adjusting a third measurement of the reference encoding stream based on a difference between the reference encoding stream and the current encoding stream to determine the first measurement.

In some embodiments, the difference comprises a difference in a bitrate between the reference encoding stream and the current encoding stream.

In some embodiments, the difference comprises a conversion coefficient between a change in a bitrate between the reference encoding stream and the current encoding stream and a change in a quality measurement.

In some embodiments, the method further comprising: applying a static threshold to the third measurement to limit a value of the first measurement to the static threshold.

In some embodiments, the first measurement comprises a threshold list for frames of the reference encoding stream, and thresholds in the threshold list are compared to respective frames of the current encoding stream.

In some embodiments, comparing the second measurement of the current encoding stream to the first measurement of the reference encoding stream comprises: using a sliding window to compare the first measurement for a first set of frames in the reference encoding stream and to the second measurement for a corresponding first set of frames in the current encoding stream.

In some embodiments, the sliding window is moved to compare the first measurement for different set of frames in the reference encoding stream and to the second measurement for corresponding different sets of frames in the current encoding stream.

In some embodiments, outputting whether the current encoding stream is validated comprises: counting a number of failures when comparing the first measurement for sets of frames in the reference encoding stream and the second measurement for corresponding sets of frames in the current encoding stream; and outputting a result for whether the current encoding stream is validated based on the number of failures.

In some embodiments, outputting whether the current encoding stream is validated comprises: locally identifying one or more frames where it is determined that encoding errors occurred in the reference encoding stream based on the comparing.

In some embodiments, outputting whether the current encoding stream is validated comprises: determining an adjusted encoding parameter to re-encode one or more frames of the current encoding stream.

In some embodiments, a non-transitory computer-readable storage medium containing instructions, that when executed, control a computer system to be operable for: receiving a current encoding stream of a video; selecting a reference encoding stream based on a similarity between the reference encoding stream and the current encoding stream; selecting a first measurement for the reference encoding stream to measure a quality of the reference encoding stream; comparing a second measurement of the current encoding stream to the first measurement of the reference encoding stream; and outputting whether the current encoding stream is validated based on the comparing.

In some embodiments, selecting the reference encoding stream comprises: comparing a first characteristic of the current encoding stream to a second characteristic of the reference encoding stream; and determining whether to use the reference encoding stream as a reference for the current encoding stream.

In some embodiments, an apparatus comprising: one or more computer processors; and a non-transitory computer-readable storage medium comprising instructions, that when executed, control the one or more computer processors to be operable for: receiving a current encoding stream of a video; selecting a reference encoding stream based on a similarity between the reference encoding stream and the current encoding stream; selecting a first measurement for the reference encoding stream to measure a quality of the reference encoding stream; comparing a second measurement of the current encoding stream to the first measurement of the reference encoding stream; and outputting whether the current encoding stream is validated based on the comparing.

System

Figure 12:
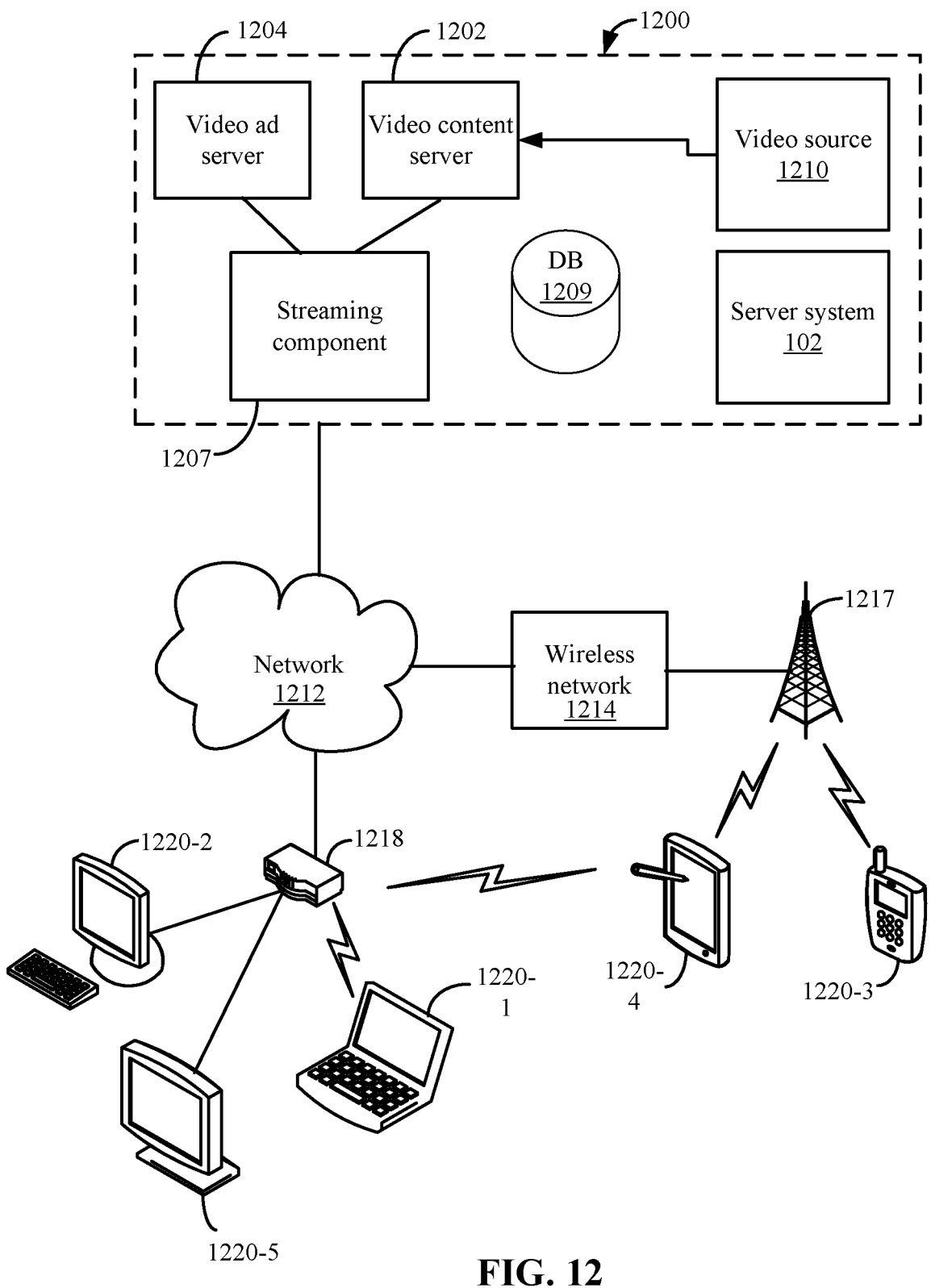
FIG. 12 depicts a video streaming system in communication with multiple client devices via one or more communication networks according to one embodiment.

Features and aspects as disclosed herein may be implemented in conjunction with a video streaming system 1200 in communication with multiple client devices via one or more communication networks as shown in FIG. 12. Aspects of the video streaming system 1200 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 1200, video data may be obtained from one or more sources for example, from a video source 1210, for use as input to a video content server 1202. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 1200 may include one or more computer servers or modules 1202, 1204, and/or 1207 distributed over one or more computers. Each server 1202, 1204, 1207 may include, or may be operatively coupled to, one or more data stores 1209, for example databases, indexes, files, or other data structures. A video content server 1202 may access a data store (not shown) of various video segments. The video content server 1202 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 1204 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 1200, a public service message, or some other information. The video advertising server 1204 may serve the video advertising segments as directed by a user interface controller (not shown).

The video streaming system 1200 also may include server system 102.

The video streaming system 1200 may further include an integration and streaming component 1207 that integrates video content and video advertising into a streaming video segment. For example, streaming component 1207 may be a content server or streaming media server. A controller (not shown) may determine the selection or configuration of advertising in the streaming video based on any suitable algorithm or process. The video streaming system 1200 may include other modules or units not depicted in FIG. 12, for example, administrative servers, commerce servers, network infrastructure, advertising selection engines, and so forth.

The video streaming system 1200 may connect to a data communication network 1212. A data communication network 1212 may comprise a local area network (LAN), a wide area network (WAN), for example, the Internet, a telephone network, a wireless cellular telecommunications network (WCS) 1214, or some combination of these or similar networks.

One or more client devices 1220 may be in communication with the video streaming system 1200, via the data communication network 1212, wireless cellular telecommunications network 1214, and/or another network. Such client devices may include, for example, one or more laptop computers 1220-1, desktop computers 1220-2, "smart" mobile phones 1220-3, tablet devices 1220-4, network-enabled televisions 1220-5, or combinations thereof, via a router 1218 for a LAN, via a base station 1217 for a wireless cellular telecommunications network 1214, or via some other connection. In operation, such client devices 1220 may send and receive data or instructions to the system 1200, in response to user input received from user input devices or other input. In response, the system 1200 may serve video segments and metadata from the data store 1209 responsive to selection of media programs to the client devices 1220. Client devices 1220 may output the video content from the streaming video segment in a media player using a display screen, projector, or other video output device, and receive user input for interacting with the video content.

Distribution of audio-video data may be implemented from streaming component 1207 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth, and structure of those files, delivers just the amount of data necessary to play the video, at the rate needed to play it. Streaming media servers may also account for the transmission bandwidth and capabilities of the media player on the destination client. Streaming component 1207 may communicate with client device 1220 using control messages and data messages to adjust to changing network conditions as the video is played. These control messages can include commands for enabling control functions such as fast forward, fast reverse, pausing, or seeking to a particular part of the file at the client.

Since streaming component 1207 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 1207 may use TCP-based protocols, such as HyperText Transfer Protocol (HTTP) and Real Time Messaging Protocol (RTMP). Streaming component 1207 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 13:
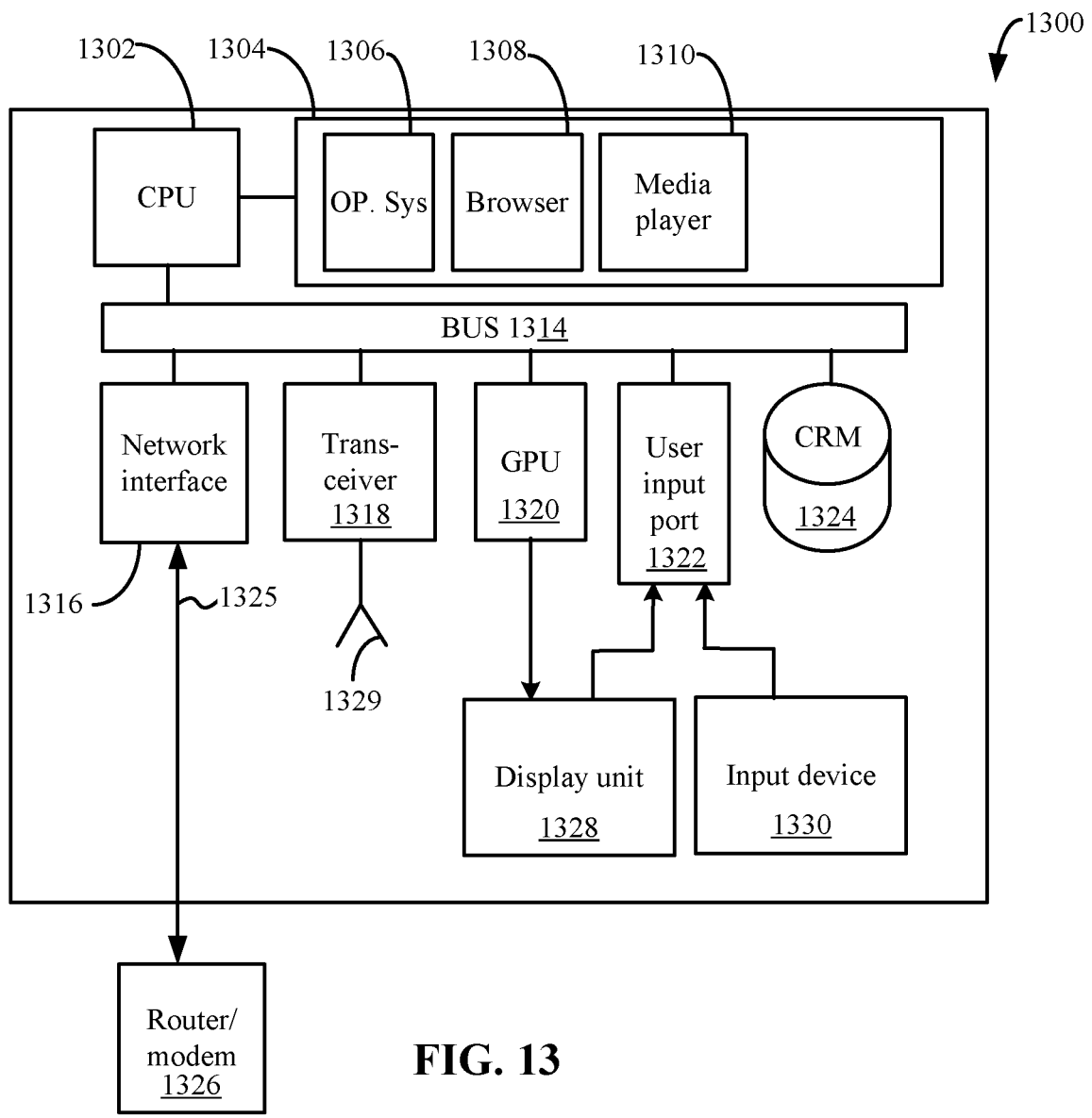
FIG. 13 depicts a diagrammatic view of an apparatus for viewing video content and advertisements.

Referring to FIG. 13, a diagrammatic view of an apparatus 1300 for viewing video content and advertisements is illustrated. In selected embodiments, the apparatus 1300 may include a processor (CPU) 1302 operatively coupled to a processor memory 1304, which holds binary-coded functional modules for execution by the processor 1302. Such functional modules may include an operating system 1306 for handling system functions such as input/output and memory access, a browser 1308 to display web pages, and media player 1310 for playing video. The memory 1304 may hold additional modules not shown in FIG. 13, for example modules for performing other operations described elsewhere herein.

A bus 1314 or other communication component may support communication of information within the apparatus 1300. The processor 1302 may be a specialized or dedicated microprocessor configured or operable to perform particular tasks in accordance with the features and aspects disclosed herein by executing machine-readable software code defining the particular tasks. Processor memory 1304 (e.g., random access memory (RAM) or other dynamic storage device) may be connected to the bus 1314 or directly to the processor 1302, and store information and instructions to be executed by a processor 1302. The memory 1304 may also store temporary variables or other intermediate information during execution of such instructions.

A computer-readable medium in a storage device 1324 may be connected to the bus 1314 and store static information and instructions for the processor 1302; for example, the storage device (CRM) 1324 may store the modules 1306, 1308, 1310 and 1312 when the apparatus 1300 is powered off, from which the modules may be loaded into the processor memory 1304 when the apparatus 1300 is powered up. The storage device 1324 may include a non-transitory computer-readable storage medium holding information, instructions, or some combination thereof, for example instructions that when executed by the processor 1302, cause the apparatus 1300 to be configured or operable to perform one or more operations of a method as described herein.

A communication interface 1316 may also be connected to the bus 1314. The communication interface 1316 may provide or support two-way data communication between the apparatus 1300 and one or more external devices, e.g., the streaming system 1200, optionally via a router/modem 1326 and a wired or wireless connection. In the alternative, or in addition, the apparatus 1300 may include a transceiver 1318 connected to an antenna 1329, through which the apparatus 1300 may communicate wirelessly with a base station for a wireless communication system or with the router/modem 1326. In the alternative, the apparatus 1300 may communicate with a video streaming system 1200 via a local area network, virtual private network, or other network. In another alternative, the apparatus 1300 may be incorporated as a module or component of the system 1200 and communicate with other components via the bus 1314 or by some other modality.

The apparatus 1300 may be connected (e.g., via the bus 1314 and graphics processing unit 1320) to a display unit 1328. A display 1328 may include any suitable configuration for displaying information to an operator of the apparatus 1300. For example, a display 1328 may include or utilize a liquid crystal display (LCD), touchscreen LCD (e.g., capacitive display), light emitting diode (LED) display, projector, or other display device to present information to a user of the apparatus 1300 in a visual display.

One or more input devices 1330 (e.g., an alphanumeric keyboard, microphone, keypad, remote controller, game controller, camera, or camera array) may be connected to the bus 1314 via a user input port 1322 to communicate information and commands to the apparatus 1300. In selected embodiments, an input device 1330 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1328, for example using a touch sensitive screen. A cursor control device may communicate direction information and command selections to the processor 1302 and control cursor movement on the display 1328. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   receiving, by a computing device, a current encoding stream of a video;
   selecting, by the computing device, a first measurement for a reference encoding stream to measure a quality of the reference encoding stream, wherein selecting the first measurement for the reference encoding stream comprises:
   adjusting a third measurement of the reference encoding stream based on a difference between the reference encoding stream and the current encoding stream to determine the first measurement;
   comparing, by the computing device, a second measurement of the current encoding stream to the first measurement of the reference encoding stream; and outputting, by the computing device, whether the current encoding stream is validated based on the comparing.

2. The method of claim 1, further comprising:
selecting the reference encoding stream based on a similarity between the reference encoding stream and the current encoding stream.

3. The method of claim 2, wherein selecting the reference encoding stream comprises:
comparing a first characteristic of the current encoding stream to a second characteristic of the reference encoding stream; and
determining whether to use the reference encoding stream as a reference for the current encoding stream.

4. The method of claim 2, wherein selecting the reference encoding stream comprises:
comparing the current encoding stream to a plurality of reference encoding streams; and
selecting the reference encoding stream from the plurality of reference encoding streams based on a similarity to the current encoding stream.

5. The method of claim 2, wherein selecting the reference encoding stream comprises:
using a reference encoding stream from another encoding of the video at a different bitrate.

6. The method of claim 2, wherein selecting the reference encoding stream comprises:
using a reference encoding stream from another encoding of the video using a different encoding protocol than that used for encoding the current encoding stream.

7. The method of claim 1, wherein selecting the first measurement for the reference encoding stream comprises:
determining the first measurement for at least a portion of frames of the reference encoding stream.

8. The method of claim 1, wherein selecting the first measurement for the reference encoding stream comprises:
determining the first measurement for each frame in the reference encoding stream.

9. The method of claim 1, wherein the difference comprises a difference in a bitrate between the reference encoding stream and the current encoding stream.

10. The method of claim 1, wherein the difference comprises a conversion coefficient between a change in a bitrate between the reference encoding stream and the current encoding stream and a change in a quality measurement.

11. The method of claim 1, further comprising:
applying a static threshold to the third measurement to limit a value of the first measurement to the static threshold.

12. The method of claim 1, wherein:
the first measurement comprises a threshold list for frames of the reference encoding stream, and
thresholds in the threshold list are compared to respective frames of the current encoding stream.

13. The method of claim 1, wherein comparing the second measurement of the current encoding stream to the first measurement of the reference encoding stream comprises:
using a sliding window to compare the first measurement for a first set of frames in the reference encoding stream and to the second measurement for a corresponding first set of frames in the current encoding stream.

14. The method of claim 13, wherein the sliding window is moved to compare the first measurement for different set of frames in the reference encoding stream and to the second measurement for corresponding different sets of frames in the current encoding stream.

15. The method of claim 1, wherein outputting whether the current encoding stream is validated comprises:
counting a number of failures when comparing the first measurement for sets of frames in the reference encoding stream and the second measurement for corresponding sets of frames in the current encoding stream; and
outputting a result for whether the current encoding stream is validated based on the number of failures.

16. The method of claim 1, wherein outputting whether the current encoding stream is validated comprises:
locally identifying one or more frames where it is determined that encoding errors occurred in the reference encoding stream based on the comparing.

17. The method of claim 1, wherein outputting whether the current encoding stream is validated comprises:
determining an adjusted encoding parameter to re-encode one or more frames of the current encoding stream.

18. A non-transitory computer-readable storage medium containing instructions, that when executed, control a computer system to be operable for:
receiving a current encoding stream of a video;
selecting a first measurement for a reference encoding stream to measure a quality of the reference encoding stream, wherein selecting the first measurement for the reference encoding stream comprises:
adjusting a third measurement of the reference encoding stream based on a difference between the reference encoding stream and the current encoding stream to determine the first measurement;
comparing a second measurement of the current encoding stream to the first measurement of the reference encoding stream; and
outputting whether the current encoding stream is validated based on the comparing.

19. An apparatus comprising:
one or more computer processors; and
a non-transitory computer-readable storage medium comprising instructions, that when executed, control the one or more computer processors to be operable for:
receiving a current encoding stream of a video;
selecting a first measurement for a reference encoding stream to measure a quality of the reference encoding stream, wherein selecting the first measurement for the reference encoding stream comprises:
adjusting a third measurement of the reference encoding stream based on a difference between the reference encoding stream and the current encoding stream to determine the first measurement;
comparing a second measurement of the current encoding stream to the first measurement of the reference encoding stream; and
outputting whether the current encoding stream is validated based on the comparing.

20. The non-transitory computer-readable storage medium of claim 18, further operable for:
selecting the reference encoding stream based on a similarity between the reference encoding stream and the current encoding stream.

* * * * *